J. C. WARRING.
TIRE PROTECTOR.
APPLICATION FILED DEC. 8, 1908.

945,649.

Patented Jan. 4, 1910.

Witnesses:
Nathan F. Fretter
Brennan B. West

Inventor
James C. Warring
By Bates, Fouts & Hull
Attys

UNITED STATES PATENT OFFICE.

JAMES C. WARRING, OF ASHLAND, OHIO, ASSIGNOR, BY DIRECT AND MESNE ASSIGNMENTS, TO GUY V. KRICHBAUM, OF ASHLAND, OHIO.

TIRE-PROTECTOR.

945,649. Specification of Letters Patent. Patented Jan. 4, 1910.

Application filed December 8, 1908. Serial No. 466,493.

*To all whom it may concern:*

Be it known that I, JAMES C. WARRING, a citizen of the United States, residing at Ashland, in the county of Ashland and State of Ohio, have invented a certain new and useful Improvement in Tire-Protectors, of which the following is a full, clear, and exact description, reference being had to the accompanying drawings.
My invention relates to pneumatic tire protectors, and has for its object the provision of a protector adapted to be inserted between the inner tube and outer shoe of the tire, which protector prevents the access of pointed articles to the inner tube.

More particularly my invention comprises a tire protector particularly prepared by treatment previous to its insertion in the tire.
Generally speaking, the invention comprises the elements and combinations thereof set forth in the claims.

Figure 1:
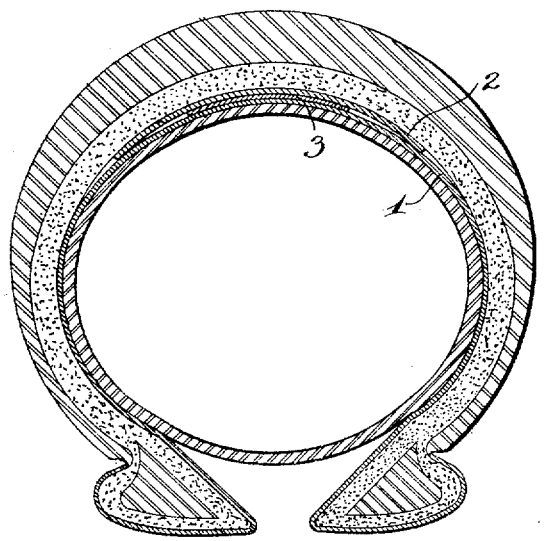
Figure 2:
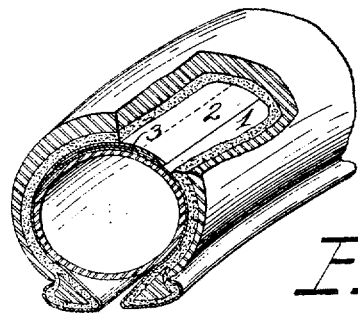

Reference should be had to the accompanying drawings, in which—
Figure 1 is a section through a tire showing my tire protector in place; Fig. 2 is a perspective of the tire with certain parts of the tire broken away and showing the tire protector in position.
Within the outer shoe is a lining 1 which conforms loosely to the inner contour of the shoe. This lining extends around the lower ends of the shoe and upon the outer side of that part which engages with the rims of the wheels to hold the tire in place. Between this member and the shoe is a second strip 2 which extends upon each side of the center line of the tire an equal distance. Between the member 2 and the lining member 1 is a third strip 3 which is of less breadth than the member 2. This strip likewise extends equally upon both sides of the axis of the tire and is about the width of the tread of the tire.
The members 1, 2 and 3 are made of canvas, although it is obvious that other material might be used having the same general properties as canvas. The canvas of which the members 1, 2 and 3 are made is prepared before being inserted within the shoe of the tire by being thoroughly impregnated with a solution of rubber, suitably prepared for vulcanizing.

It will be apparent that the members 1, 2
and 3 will mutually adhere to each other, due
to the fact that each is saturated with rubber solution and when in use in the tire, due to th pressure resulting from the weight of the vehicle, the three pieces will be compressed so that they will closely adhere to each other.

Due to the great heat which is generated as the tire passes over the road when the vehicle upon which it is used is in motion, the rubber with which the canvas members 1, 2 and 3 are impregnated will become vulcanized, thereby making the members 1, 2 and 3 more impervious to the passage of puncturing articles through the same and at the same time allowing of the utmost flexibility. The added thickness at that portion of the tire which is within the shoe opposite the tread will effectually stop all the puncturing particles which may tend to come straight through the tire, while those which may approach the inner shoe of the tire on either side of the tread portion of the shoe will, upon coming against the vulcanized member 1 or 2, simply cause the member to give or flex more or less and will prevent the puncturing particle from coming in contact with the inner tube of the tire. It will be seen that my tire protector forms a simple and yet most effective protection for the inner tube of the tire. A further result is obtained due to the heat generated as the tire passes over the road when in use, which is, that the liner becomes vulcanized to the shoe itself. This vulcanization is not continuous throughout the whole surface of the liner but it occurs in spots in greater or less area throughout the length of the same.

The vulcanizing of the liner to the shoe produces a substantial unity between the two which results in the liner forming a perfect reinforcing and supporting element for the outer shoe, giving added strength to the shoe and in case that the shoe is split or cut, the liner will hold the severed parts from entirely separating. A further result is gained, in that the liner is conformed to the tire while in use at the same time that the vulcanization is taking place. By this method the liner has a perfectly natural fit in the tire and is not under any strain whatsoever. This differentiates from the process wherein the liner is vulcanized to the tire before the tire is placed upon the wheel in connection with which it is to be used. In the last mentioned process, an accurate fit is seldom secured and this leaves the liner under a strain when the tire is in use.

Having thus described my invention, I claim:

1. A liner for tires comprising a piece of absorbent flexible material impregnated with a vulcanized rubber solution.

2. A liner for tires comprising a plurality of superimposed strips of absorbent flexible material which are impregnated with a vulcanizable rubber solution.

3. The combination with a tire member, of a liner member within said tire, one of said members being treated with a vulcanizable solution of rubber whereby the liner will become vulcanized to the tire by the heat generated when the tire is in use.

4. The combination with a tire member, of a liner member within said tire, the liner being prepared with a vulcanizable solution of rubber whereby the liner will become vulcanized to the tire by the heat generated when the tire is in use.

5. The combination with a tire, of a liner therefor within the tire, said liner comprising a plurality of strips of absorbent material imposed one upon the other, said material being treated with a vulcanizable rubber solution whereby the liner will become vulcanized to the tire by the heat generated when the tire is in use.

In testimony whereof, I hereunto affix my signature in the presence of two witnesses.

JAMES C. WARRING.

Witnesses:
H. A. MOWREY,
GEO. B. SMITH.

It is hereby certified that in Letter Patent No. 945,649, granted January 4, 1910, upon the application of James C. Warring, of Ashland, Ohio, for an improvement in "Tire-Protectors," an error appears in the printed specification requiring correction as follows: Page 2, line 8, the word "vulcanized" should read *vulcanizable;* and that the said Letters Patent should be read with this correction therein that the same may conform to the record of the case in the Patent Office.

Signed and sealed this 8th day of February, A. D., 1910.

[SEAL.]

E. B. MOORE,
*Commissioner of Patents.* tioned process, an accurate fit is seldom secured and this leaves the liner under a strain when the tire is in use.

Having thus described my invention, I claim:

1. A liner for tires comprising a piece of absorbent flexible material impregnated with a vulcanized rubber solution.

2. A liner for tires comprising a plurality of superimposed strips of absorbent flexible material which are impregnated with a vulcanizable rubber solution.

3. The combination with a tire member, of a liner member within said tire, one of said members being treated with a vulcanizable solution of rubber whereby the liner will become vulcanized to the tire by the heat generated when the tire is in use.

4. The combination with a tire member, of a liner member within said tire, the liner being prepared with a vulcanizable solution of rubber whereby the liner will become vulcanized to the tire by the heat generated when the tire is in use.

5. The combination with a tire, of a liner therefor within the tire, said liner comprising a plurality of strips of absorbent material imposed one upon the other, said material being treated with a vulcanizable rubber solution whereby the liner will become vulcanized to the tire by the heat generated when the tire is in use.

In testimony whereof, I hereunto affix my signature in the presence of two witnesses.

JAMES C. WARRING.

Witnesses:
H. A. MOWREY,
GEO. B. SMITH.

---

It is hereby certified that in Letter Patent No. 945,649, granted January 4, 1910, upon the application of James C. Warring, of Ashland, Ohio, for an improvement in "Tire-Protectors," an error appears in the printed specification requiring correction as follows: Page 2, line 8, the word "vulcanized" should read *vulcanizable;* and that the said Letters Patent should be read with this correction therein that the same may conform to the record of the case in the Patent Office.

Signed and sealed this 8th day of February, A. D., 1910.

[SEAL.]

E. B. MOORE,
*Commissioner of Patents.*

Correction in Letters Patent No. 945,649.

It is hereby certified that in Letter Patent No. 945,649, granted January 4, 1910, upon the application of James C. Warring, of Ashland, Ohio, for an improvement in "Tire-Protectors," an error appears in the printed specification requiring correction as follows: Page 2, line 8, the word "vulcanized" should read *vulcanizable;* and that the said Letters Patent should be read with this correction therein that the same may conform to the record of the case in the Patent Office.

Signed and sealed this 8th day of February, A. D., 1910.

[SEAL.]

E. B. MOORE,
*Commissioner of Patents.*